United States Patent
Shockey

[19]

[11] Patent Number: 6,094,450
[45] Date of Patent: Jul. 25, 2000

[54] SPREAD SPECTRUM CHIP SHIFT KEYING MODULATION/DEMODULATION SYSTEM AND METHOD

[75] Inventor: Bruce Edward Shockey, Mason, Ohio

[73] Assignee: Cincinnati Electronics Corporation, Mason, Ohio

[21] Appl. No.: 08/879,356

[22] Filed: Jun. 20, 1997

[51] Int. Cl.$^7$ .............................. H04K 1/00; H03C 3/00; H03D 3/00

[52] U.S. Cl. .......................... 375/141; 375/142; 332/103; 329/304

[58] Field of Search ..................................... 375/206, 208, 375/279, 281, 308, 329; 332/103, 104; 329/304, 309

[56] References Cited

U.S. PATENT DOCUMENTS

| | | |
|---|---|---|
| 4,217,586 | 8/1980 | McGuffin . |
| 4,583,231 | 4/1986 | Puckette . |
| 4,933,952 | 6/1990 | Albrieux et al. . |
| 4,998,261 | 3/1991 | van Driest et al. . |
| 5,020,075 | 5/1991 | Tachita ..................................... 375/200 |
| 5,166,951 | 11/1992 | Schilling . |
| 5,243,622 | 9/1993 | Lux et al. . |
| 5,257,282 | 10/1993 | Adkisson et al. . |
| 5,313,457 | 5/1994 | Hostetter et al. . |
| 5,383,220 | 1/1995 | Murai . |
| 5,414,728 | 5/1995 | Zehavi . |
| 5,454,005 | 9/1995 | O'Clock et al. . |
| 5,499,265 | 3/1996 | Dixon et al. . |
| 5,712,869 | 1/1998 | Lee et al. ................................. 375/206 |

FOREIGN PATENT DOCUMENTS

| | | |
|---|---|---|
| 2258976 | 2/1993 | United Kingdom . |
| 2290199 | 12/1995 | United Kingdom . |

*Primary Examiner*—Stephen Chin
*Assistant Examiner*—Albert Park
*Attorney, Agent, or Firm*—Dinsmore & Shohl LLP

[57] ABSTRACT

A modulation/demodulation system and method comprising transmitting structure having first and second PN generators which produce distinct, synchronized, first and second PN sequences. A tapped delay line generates a plurality of symbols from the second PN sequence, each symbol corresponding to an offset of the second PN sequence by one or more chips from the epoch of the first PN sequence. A plurality of output taps are associated with the tapped delay line, with each tap corresponding to one of the symbols. A symbol selection device associated with the output taps selects from amongst the symbols based upon one or more message signal bits. The selected symbols and first PN sequence are applied to separate channels of a modulator to modulate a carrier signal. At a destination, first and second local PN generators generate first and second PN sequences which correspond to the first and second PN sequences in the transmitting structure. A tapped delay line connected to the second local PN generator generates a plurality of symbols which correspond to the symbols in the transmitting structure. An analog baseband signal is recovered from the modulated carrier signal and sampled, and each sample is multiplied by the symbols from the tapped delay line. The resulting products are filtered, summed and compared to a predetermined threshold, and the sum which exceeds the threshold is converted to a bit pattern. Consecutive bit patterns are combined to produce a serial data stream which corresponds to the message signal.

31 Claims, 6 Drawing Sheets

SPREAD SPECTRUM CHIP SHIFT KEYING MODULATION/DEMODULATION SYSTEM AND METHOD

TECHNICAL FIELD

The present invention relates to a system and method for modulating and demodulating a signal containing one or more data bits, such as in a communication system and, more particularly, to a modulation/demodulation system and method that enables digital communications at a lower energy per bit verses noise spectral density ($E_b/N_o$) ratio than any existing modulation/demodulation technique, and which is not limited by the $E_b/N_o=-1.6$ dB limit predicted by Claude Shannon.

BACKGROUND OF THE INVENTION

Numerous types of communication systems have been developed to allow for the transmission of information signals from a source location to a physically distinct user destination. These systems have typically been either analog or digital systems, in which either the amplitude, frequency or phase of a carrier signal is modulated in order to convey the information. Traditionally, most communications have been conducted using analog systems. However, digital systems have become increasingly popular, particularly over the last decade, due to their numerous advantages such as improved immunity to noise, increased communication capacity and improved security for communications through the use of encryption.

One method for transmitting information signals in a digital communication system is referred to as spread spectrum. In a spread spectrum system, an information signal is altered or modulated in a manner that spreads the signal over a bandwidth that is much wider than that required to transmit the signal. This spreading of a signal over a wide bandwidth provides spread spectrum systems with many advantages over alternative communication techniques. Among the advantages inherent in spread spectrum systems are their resistance to external interference and jamming, low spectral density and multiple access capabilities.

Several different modulation techniques have been developed for spreading an information signal in spread spectrum communication systems. These techniques include direct sequence, frequency hopping, time-hopping and chirping. In the direct sequence technique, the information or message signal is combined with a second signal having a fixed pseudorandom code. This pseudorandom code (otherwise known as a PN code or sequence) is a time function which is broken down into a number of time intervals, termed "chips", which each have a value of either zero or one. The time duration of each chip is typically small as compared to the duration of a bit in the message signal. Accordingly, when the information signal is combined with the pseudorandom code, a signal is produced which has a very wide bandwidth as compared to the message signal. The resulting "spread" signal may be used to modulate a carrier signal in order to transmit the message. In spread spectrum systems, M-ary modulators and, in particular, quadrature phase shift keying (QPSK) modulators, are often used for modulating a carrier signal with the spread message signal, due to the desirable energy and bandwidth utilization efficiencies associated with these modulator/demodulators.

One means by which digital communication systems, such as spread spectrum systems, can be evaluated is by comparing how efficiently each system utilizes available signal energy to transmit information. A key measure for determining the efficiency at which a system transmits information is by evaluating the system's energy utilization efficiency or $E_b/N_o$ ratio. The $E_b/N_o$ ratio is comprised of the energy per bit required by a system in order to transmit message bits at an acceptable error rate, divided by the noise spectral density produced by the system. It is desirable to have a communication system which provides as low an $E_b/N_o$ ratio as possible for a specified bit error rate in order to minimize the amount of power required by the system.

One field in which spread spectrum modulation techniques are frequently employed is satellite communication systems. Satellite communication systems are usually constrained by relatively low power levels, because the generation of high power levels in an orbiting satellite is expensive and difficult to sustain. Accordingly, spread spectrum techniques are well-suited for satellite systems, because they allow very small aperture (broad beam) antennas to be used on the ground without excessive interference with adjacent satellites. Further, the spread spectrum techniques' multiple access capability is desirable with a satellite system, due to the need to process multiple messages from ground stations.

In digital communication systems, such as, for example, satellite communication systems, there is a need to transmit data at ever increasing speeds while simultaneously limiting the amount of power required to transmit the data. However, the need to increase transmission speed while decreasing system power presents often incompatible goals, since traditionally in many communication systems the only way to increase the data transmission rate without sacrificing the reliability of the communication has been to increase the power, gain and/or antenna size in the transmitter. However, increasing any of these factors can add considerable expense to the system. Thus, the need for additional power and accompanying expense has served as a limit on the speed at which data can be transmitted. Beyond the transmission limits imposed by cost, there has been believed to be a physical limit as to the minimum $E_b/N_o$ ratio obtainable from a modulation technique. This limit was predicted by Claude Shannon to be at $E_b/N_o$ ratio=$-1.6$ dB. It has been believed to be physically impossible to reliably transmit information through a communication channel below this energy level.

Accordingly, based upon the need for increased transmission rates, and the above described limitations, it is desirable to have a modulation/demodulation system and method which provides for faster data transmission rates without the need to increase transmitter power, antenna size and/or gain. Further, it is desirable to have a modulation/demodulation system and method which enables message signals to be reliably transmitted below the Shannon limit.

SUMMARY OF THE INVENTION

Accordingly, it is a principal object of the present invention to provide a system and method for modulating and demodulating a signal which provides for data transmission at lower power levels and with smaller antennas and/or gain levels than previously required to achieve the same data transmission rate.

In particular, it is a principal object of the present invention to provide a digital communication system which provides for robust digital communications at lower $E_b/N_o$ ratios than previously achieved with state-of-the-art digital communication systems.

Another object of the present invention is to provide a modulation/demodulation system which enables reliable data transmissions below the Shannon limit of $E_b/N_o=-1.6$ dB.

Yet another object of the present invention is to provide a modulation/demodulation system and method which enables more message bits to be transmitted per logic symbol than prior modulation techniques.

A further object of the present invention is to provide a modulation/demodulation system and method which utilizes the timing relationship between two PN sequences to represent logic symbols.

A still further object of the present invention is to provide a modulation/demodulation technique which utilizes PN sequence epochs to define logic symbol periods.

Additional objects, advantages and other novel features of the invention will be set forth in part in the description that follows and, in part, will become apparent to those skilled in the art upon examination of the invention. The objects and advantages of the invention may be realized and obtained by means of the instrumentalities and combinations particularly pointed out in the appended claims.

To achieve the foregoing and other objects, and in accordance with the purposes of the present invention as described above, a modulation/demodulation system, and method for operating the same, is provided comprising transmitting structure including first and second PN generators which produce distinct first and second PN sequences of equal length. A PN clock is preferably associated with the generators for synchronizing the sequences. The second PN generator is connected to a tapped delay line which generates a plurality of symbols from the PN sequence, each symbol corresponding to an offset of the second PN sequence by one or more chips with respect to the epoch of the first PN sequence. A plurality of output taps are associated with the tapped delay line, with each tap corresponding to one of the symbol sequences. A symbol selection device is associated with the output taps for selecting from amongst the symbol sequence taps during each symbol period based upon one or more bits in a message signal. The selected symbol sequences along with the first PN sequence, are applied to separate channels of a modulator to modulate a carrier signal.

At a destination, a receiver is provided for detecting and locking onto the modulated carrier signal. First and second local PN generators are associated with the receiver for generating local first and second PN sequences which correspond to the first and second PN sequences in the transmitting structure. A tapped delay line is connected to the second local PN generator for generating a plurality of offset versions of the second or symbol sequence, which correspond to the symbols in the transmitting structure. An analog baseband signal is recovered from the modulated carrier signal and is sampled by an analog-to-digital converter. A plurality of multipliers are connected to the A/D converter and each output tap of the tapped delay line for multiplying each signal sample by each of the symbols from the tapped delay line. The resulting products are passed through a filter and summed over each symbol period.

At the end of a symbol period, the sums are passed to a threshold compare device and compared to a predetermined threshold. The sum which exceeds the threshold is passed to a bit pattern decoder and converted to a bit pattern. Bit patterns from consecutive symbol periods are combined to produce a serial data stream which corresponds to the original message signal.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different, obvious aspects all without departing from the invention.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE PREFERRED EMBODIMENTS

Reference will now be made to several preferred embodiments of the invention, examples of which are illustrated in the accompanying drawings. The present invention comprises a modulation/demodulation system, and method for operating the same, which enables a message signal to be transmitted at a faster rate and/or at lower power levels than previously possible with state-of-the-art digital communication systems. The present invention is a variation of the direct sequence spread spectrum modulation technique, wherein rather than multiplying the message signal by a PN sequence to modulate the signal, a pair of PN sequences are offset relative to each other, with the amount of offset being varied in order to represent the message signal. Since the message bits are represented by delayed PN sequences, rather than being transmitted directly, more bits can be transmitted in less time than traditional direct sequence spread spectrum systems.

Figure 1:
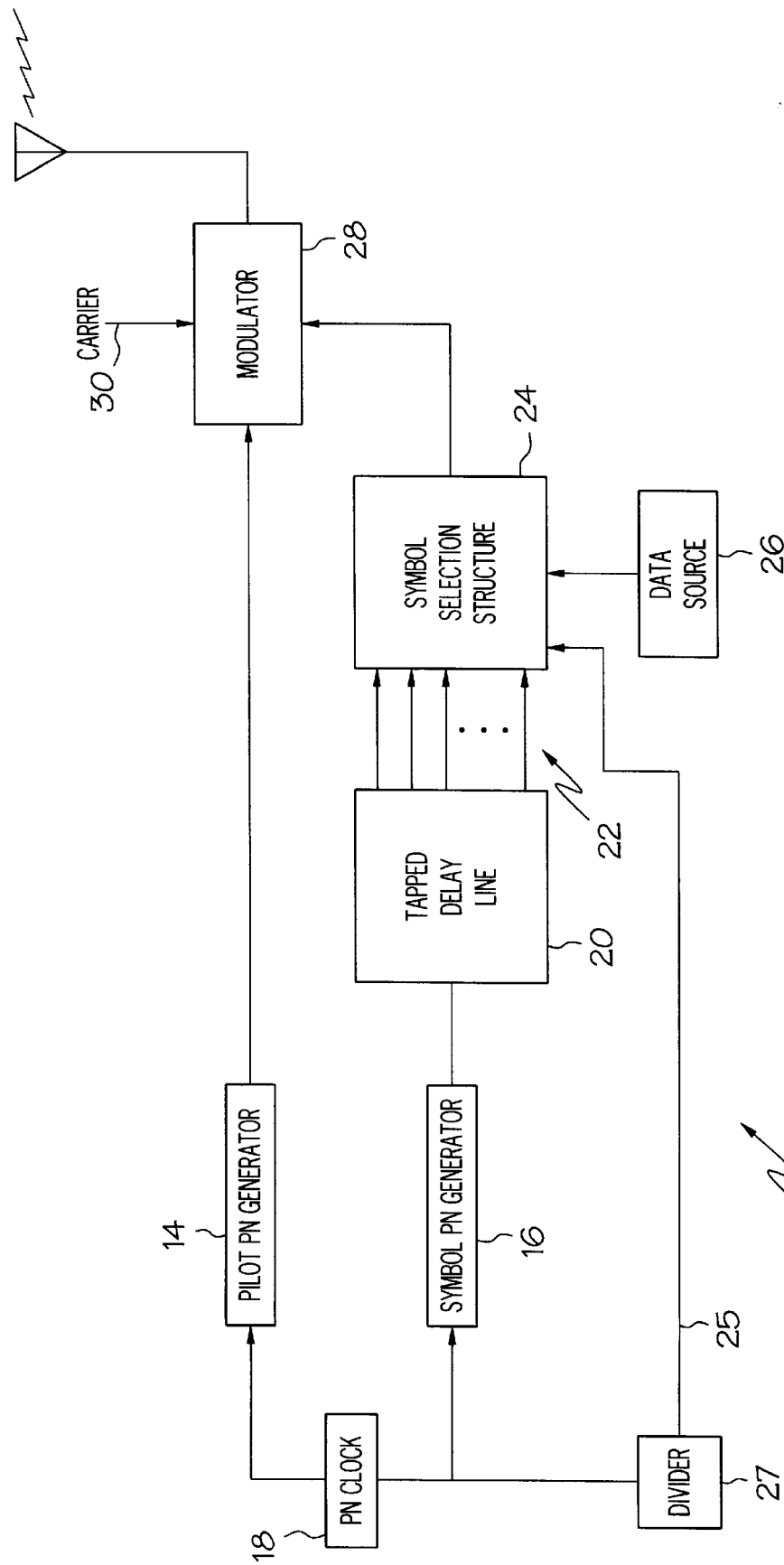
FIG. 1 is a schematic diagram depicting transmitting structure in accordance with the present invention.

FIG. 1 depicts a preferred embodiment for transmitting structure, designated generally as 12, for the chip shift keying system of the present invention. As shown in FIG. 1, the transmitting structure 12 includes a pair of PN sequence generators, which are designated as the pilot PN generator 14 and the symbol PN generator 16, which produce two distinct PN sequences. The pilot and symbol PN generators 14, 16 may be any type of PN generator known in the art, comprised, for example, of one or more shift registers or flip-flops, which preferably possesses the randomness properties of balance, run, and correlation present in direct sequence spread spectrum systems. The PN sequences produced by the pilot and symbol PN generators 14, 16 are preferably periodic and contain an equal number of time intervals or chips. The length of the sequences generated by the pilot and symbol PN generators 14, 16 may be varied, however, the minimum length for a given application is preferably $2^{K-1}$, where K is the desired number of data bits per symbol (including the polarity bit). In the present invention, the PN sequence generated by the pilot PN generator 14, which will be referred to as the pilot sequence, preferably serves as a timing reference for the modulation/demodulation system, while the PN sequence generated by the symbol PN generator 16, which will be referred to as the symbol sequence, may be used for representing logic symbols, as will be described in more detail below.

As shown in FIG. 1, a PN clock 18 is preferably associated with both the pilot and symbol PN generators 14, 16 for controlling the generation of the pilot and symbol sequences. Because the two generators 14, 16 are controlled by the same clock, they operate at the same frequency, and the epoch of each sequence is synchronized between the generators. Alternatively, the PN generators 14, 16 may be controlled by separate clocks which are synchronized together and operate at the same frequency. The synchronization between the PN sequences provides a timing reference for demodulation.

The symbol sequence from the symbol PN generator 16 is supplied to a tapped delay line 20. The tapped delay line 20 generates a plurality of symbols from the symbol PN sequence, with each symbol corresponding to a particular time offset or delay of the symbol PN sequence with respect to the pilot PN sequence epoch. The tapped delay line 20 includes a plurality of output taps, designated as 22, which are each associated with one of the symbols. Symbol selection structure 24 is associated with the output taps 22 for selecting from amongst the taps based upon a message signal from a data source 26. One or more bits in the message signal may serve as an address, with the symbol selection structure 24 selecting as an output the symbol tap corresponding to the address. As shown in FIG. 1, the selection of an output tap is controlled by a symbol clock 25, which is derived from the PN clock by clock divider 27. The symbol clock rate preferably has an integer relationship to the PN clock rate, and is preferably the PN clock rate divided by the number of chips per bit, as well as the number of bits per symbol in the particular application. The symbol clock preferably controls the symbol selection structure such that a single output tap is selected during each symbol period. The delayed version of the symbol sequence from the selected tap is transmitted along with the pilot PN sequence to a modulator 28, where the symbol and pilot sequences modulate separate channels of a carrier signal 30.

Figure 2:
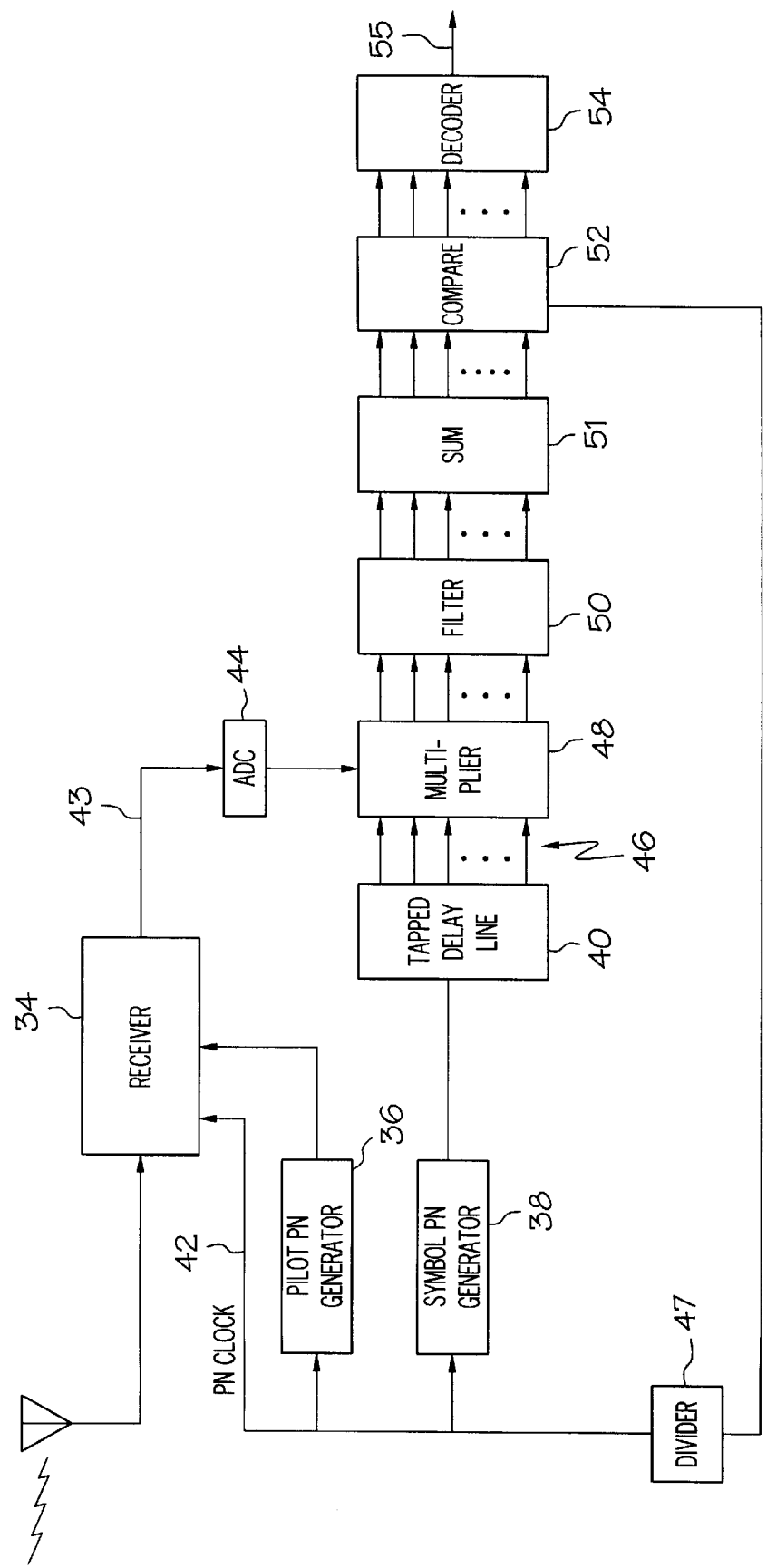
FIG. 2 is a schematic diagram depicting receiving structure in accordance with the present invention.

FIG. 2 depicts a preferred embodiment of receiving structure, designated generally as 32, in accordance with the present invention. In the present invention, the task of the receiving structure 32 is to identify the received symbol sequence epoch offset or "symbol," during each symbol period. This task is preferably achieved by correlating the received symbol sequence from the modulated carrier signal with all potential symbol epoch offset positions, reducing the bandwidth to that of the symbol rate, integrating the filtered correlations and selecting the symbol candidate with the greatest correlation. As shown in FIG. 2, the receiving structure 32 includes a conventional receiver 34 which detects the modulated carrier signal and performs carrier locking and recovery of the symbol analog baseband signal in a conventional manner. In addition, the receiver 34 preferably includes structure for aligning a pilot PN sequence, which will be referred to as a local pilot sequence, generated by a local pilot PN generator 36, with the pilot sequence detected and recovered from the modulated carrier signal. The receiver 34 aligns the local and received pilot sequences by aligning the epochs of the two sequences.

The demodulator 32 also includes a second PN generator 38, which will be referred to as the local symbol sequence generator, which is identical to the symbol PN generator 16 in the transmitting structure 12; and a second tapped delay line 40 which preferably has a structure similar to the tapped delay line 20 in the transmitting structure. The tapped delay line 40 generates a plurality of symbols comprising delayed versions of the local symbol PN sequence, in a manner similar to the tapped delay line 20 in the transmitting structure, with the number of symbols generated being equal for the two tapped delay lines. The local pilot and symbol sequence generators 36, 38 are controlled by the same PN clock signal 42, which is synchronized to PN clock 18 in the transmitting structure by virtue of the carrier locking performed by receiver 34. Controlling both sequence generators with the same clock aligns the epoch of the local symbol sequence generator with the epoch of the local pilot PN sequence, and therefore, correspondingly, to the epoch of the pilot and symbol sequences in the transmitting structure 12. The alignment between the symbol and pilot sequence epochs in both the transmitting structure 12 and receiving structure 32 enables the symbol sequence offsets produced by the tapped delay line 40 in the receiving structure to correspond to those generated by the tapped delay line 20 in the transmitting structure, thus enabling the receiving structure to identify the epoch offset and decode the signal.

As shown in FIG. 2, the analog baseband plus noise signal 43 recovered by the receiver 34 is quantized or sampled by an analog-to-digital converter 44, and multiplied by the delayed symbol sequence at each of a plurality of output taps 46 of the tapped delay line 40 by structure 48. Each of the products of the sampled baseband signal and symbol sequence offsets are filtered by low pass filter structure 50 and summed over a symbol period in summation structure 51. At the end of each symbol period, each sum is compared to a predetermined threshold in a compare device such as shown at 52, and the sum which exceeds the threshold is identified and converted by a bit pattern decoder 54 into a bit pattern. The bit pattern from decoder 54 corresponds to the original source bit pattern in the transmitting structure 12. The converted bit pattern is combined with bit patterns generated during preceding and succeeding symbol periods to provide a serial data stream 55 corresponding to the original data stream from the source 26.

Figure 3:
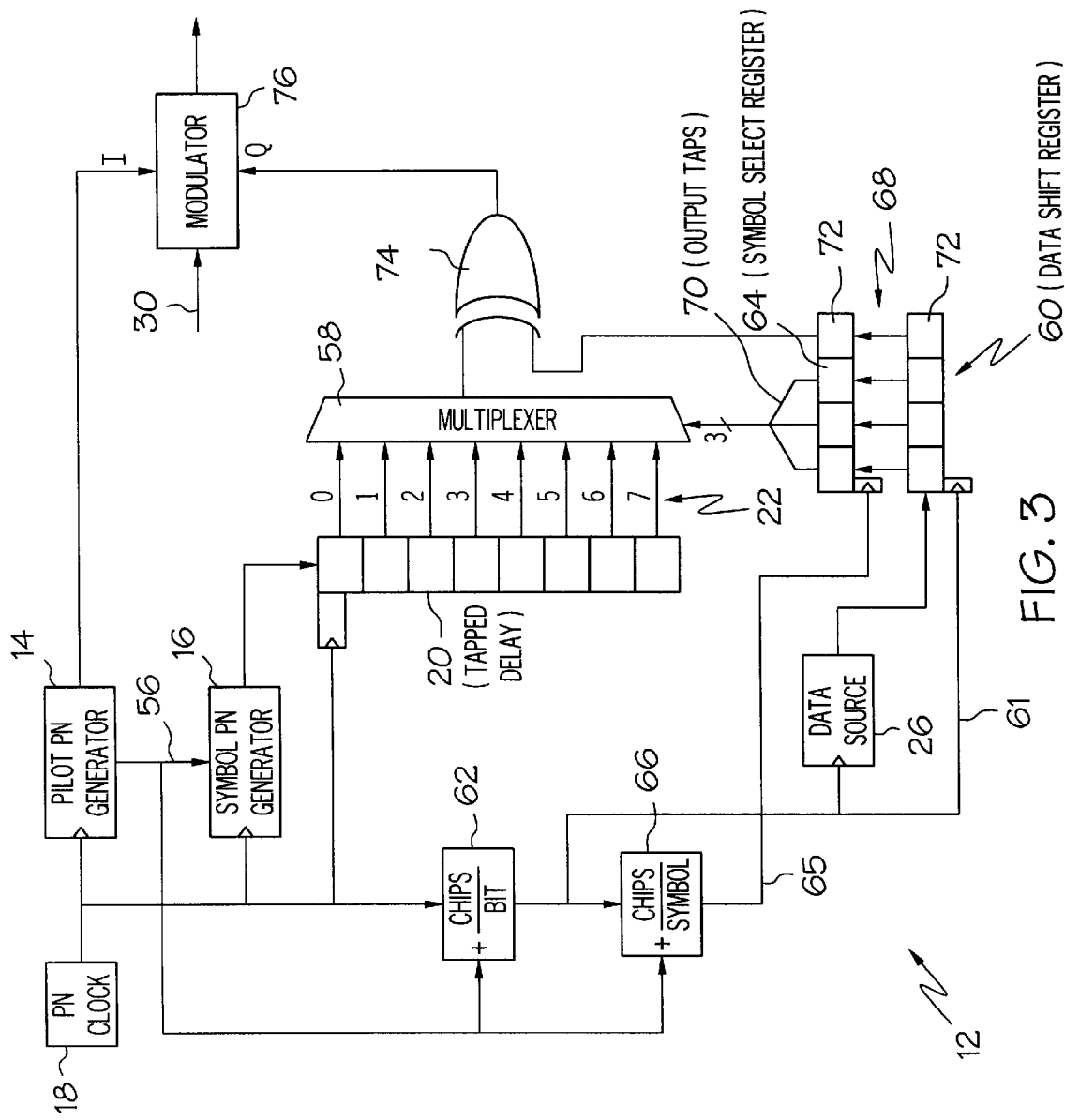
FIG. 3 is a schematic diagram of an exemplary embodiment of the transmitting structure of the present invention, depicting the transmitting structure in greater detail.

FIG. 3 depicts in further detail an exemplary embodiment for the transmitting structure 12 in accordance with the present invention. This exemplary embodiment depicts a four bit per symbol application of the invention. However, the four bit per symbol embodiment depicted in the figure is only representative of the variety of embodiments in which the present invention may be implemented. The present invention may be used for transmitting any number of symbols, or data bits per symbol, without departing from the scope of the invention, provided the number of data bits to symbols satisfies the equation K=1+LOG$_2$M, wherein K represents the number of data bits and M represents the number of symbols. In addition, the invention may be implemented using other digital and/or analog technologies, without departing from the scope of the invention.

As shown in FIG. 3, in the present invention the pilot PN sequence generator 14 and the symbol PN sequence generator 16 are preferably controlled by the same PN clock 18, which preferably operates at a higher frequency than the data bit rate from the data source 26. The PN clock 18 may operate at any frequency or chip rate, with the selected chip rate being dependent only upon the desired symbol rate and the desired number of data bits per symbol for the application. The PN clock or chip rate for a particular application may be calculated as follows: $F_{PN\ CLK}=F_{symbol}*$Bits per Symbol *Chips per Bit, wherein $F_{PN\ CLK}$=PN clock frequency in chips per second, and $F_{symbol}$=the desired symbol rate. The use of a single PN clock 18 for both PN sequence generators 14, 16 locks the operation of the generators together, and assures that the pilot and symbol sequence epochs remain aligned.

To further assure time alignment between the pilot and symbol sequences in the event of a fault or other problem in the PN clock 18 or PN generators 14, 16, a sync pulse may be periodically transmitted from the pilot PN sequence generator 14 to the symbol PN sequence generator 16. This sync pulse shown as 56 in FIG. 3, is preferably transmitted at the epoch of the pilot sequence and causes the symbol sequence generator 16 to reinitiate the symbol sequence at the epoch, if the symbol sequence is not already at the epoch. The sync pulse 56 is also preferably transmitted to a data clock divider and a symbol clock divider, which will be described in more detail below, in order to reset the data and symbol clocks.

The symbol sequence from the PN generator 16 is supplied to the tapped delay line 20, which in the exemplary embodiment shown in FIG. 3 is a shift register. While FIG. 3 depicts a shift register as the tapped delay line, it is to be understood that the invention is not to be limited to the use of a shift register, but rather may include any digital, analog or other devices which operate as a tapped delay line, including, for example, charge-coupled devices and D Flip-Flops arranged in a side-by-side manner. Further, it is to be understood that the device or arrangement used for the tapped delay line may have any number of stages depending upon the desired number of bits to be represented by the symbols. The shift register in the exemplary embodiment depicted in FIG. 3 has eight shift register stages in order to represent the three left-most, non-polarity bits in the four bit per symbol system depicted. The shift register 20 is preferably controlled by the same PN clock 18 as the pilot and symbol sequence generators 14, 16, or alternatively, by a clock having the same frequency as and synchronized to the PN clock 18, in order to input and shift chips in the symbol sequence through the device at the PN clock rate.

After each PN clock cycle each shift register stage contains a different chip in the symbol sequence. The shift register 20 inputs and shifts successive chips in the symbol sequence, and thereby generates a plurality of delayed versions of the symbol sequence, wherein the symbol sequence at each successive shift register stage is delayed one additional chip from the epoch of the pilot and symbol PN sequences. In a preferred embodiment of the present invention, each shift register stage is identified as a particular symbol, such as symbol numbers 0–7 shown in FIG. 3, with the symbol number identifying the delayed version of the symbol sequence corresponding to that shift register stage.

For the embodiment shown in FIG. 3, during system operation the first chip in the symbol sequence, i.e., chip 0, is input to the first stage of the shift register, identified as symbol 0, during the first PN clock transition. At the next PN clock transition, the first chip is shifted to the second stage, i.e. symbol 1, and the second chip is input to the first stage, symbol 0. At the next PN clock transmission, the third chip is input as symbol 0, and the prior two chips are shifted to symbols 2 and 1 respectively. The shift register continues operating in this manner for each PN clock transition, inputting and shifting the chips of the symbol sequence through the shift register. When the number of chips exceed the number of shift register stages, the earliest chip is deleted from the register.

As shown in FIG. 3, each shift register stage is associated with an output tap, designated as 22, which is in turn connected to symbol selection structure. In this exemplary embodiment, the symbol selection structure includes a multiplexer 58, which may be of any conventional form suitable for selecting from amongst the shift register output taps 22 based upon an address supplied to the multiplexer. As also shown in FIG. 3, in this exemplary embodiment the symbol selection structure also includes a second shift register 60, which will be referred to as a data shift register, which is connected to the data source 26 for receiving successive bits in a data or message bit stream and forming a multiplexer address. The data shift register depicted in FIG. 3 includes 4 stages, such that 4 bits are represented by each symbol. However, it is to be understood that the data shift register 60 may have any number of stages depending upon the desired number of bits per symbol for the particular application of the invention, without departing from the scope of the invention. The data shift register 60 is operated by a data clock signal 61 which is preferably derived from the PN clock 18 by clock divider 62, such that there is an integer relationship between the PN clock or chip rate and the data clock or bit rate. This integer relationship assures that a symbol does not overlap between successive PN sequence periods. In the preferred embodiment, a data or message bit stream from the source 26 is input and shifted in the data shift register 60 at the data clock rate.

As shown in FIG. 3, the symbol selection structure also may include a third shift register 64, which will be referred to as a symbol select register. The symbol select register 64 preferably contains the same number of stages as the data shift register 60, and provides symbol selection addresses to the multiplexer 58 from the data shift register 60. The symbol select register 64 transfers symbol selection addresses to the multiplexer 58 at the transition of a symbol clock signal 65, which is derived from the data clock signal by symbol clock divider 66. The symbol clock is preferably derived by dividing the data clock rate by the number of bits per symbol in the application, so that the symbol clock clicks, transferring a new address to the multiplexer 58, after a new set of data bits has been cycled into the data and symbol select shift registers 60, 64.

Output taps, which are collectively designated as 68, are provided at each stage of the data shift register 60. Each of the output taps 68 is, in turn, associated with one stage of the symbol select shift register 64, so that the contents of the data shift register is latched into the symbol select register at the data clock rate. When the symbol clock cycles, the contents of the symbol select register 64 is transmitted to the multiplexer 58, through output taps 70 associated with each stage of the symbol select register. The multiplexer selects an output tap 22 from the contents of the symbol select register. Once an output tap has been selected by the multiplexer, the symbol sequence is transferred from that tap to a modulator for the duration of the symbol period.

At the symbol clock transition, if the contents of the symbol select register have changed, the tap selection will change, causing the symbol sequence to be transmitted through a different tap, such that a different delayed version of the symbol sequence is transmitted to the modulator. Due to the shifting of the symbol sequence chips through the shift register 20, as well as the time difference between the PN sequence epoch and symbol clock cycle, the chip position of the sequence at each selected tap will vary. The delay between the chip position at the selected tap and the pilot sequence epoch corresponds to the message bit stream represented by the symbol, and it is this delay which is identified in the receiving structure 32 to decode the symbol into a bit stream.

As shown in FIG. 3, one stage of the data and symbol select shift registers 60, 64 may be used as a sequence polarity bit. The use of a polarity bit is optional, but may be used to double the number of symbols represented by a given symbol PN sequence. Ordinarily, the maximum number of symbols which can be represented by a given symbol PN sequence is equal to the symbol PN sequence length. However, using a polarity bit doubles this maximum number of symbols. If a polarity bit is used, then the multiplexer address is preferably formed from the non-polarity bit stages of the symbol select register 64, with the rightmost bit 72 of the data and symbol select registers serving as the polarity bit. The selected symbol sequence is combined with the polarity bit, such as by modulo-2 addition or an EXCLUSIVE-OR logic device, such as shown in FIG. 4, prior to modulating the carrier signal.

The delayed sequence from the selected tap, or the delayed sequence combined with a polarity bit if a polarity bit is being used, is transmitted along with the pilot sequence to the modulator 76 where it is modulated with an RF carrier signal 30. In the exemplary embodiment shown in FIG. 4, the modulator 76 is a QPSK spread spectrum modulator in which the selected delayed version of the symbol sequence is applied to the Q channel of the modulator and the pilot sequence is applied to the I channel of the modulator. However, it is to be understood that although the invention is described with respect to a QPSK spread spectrum modulator, it is possible to use other types of M-ary modulators in the present invention without departing from the scope of the invention.

Figure 4:
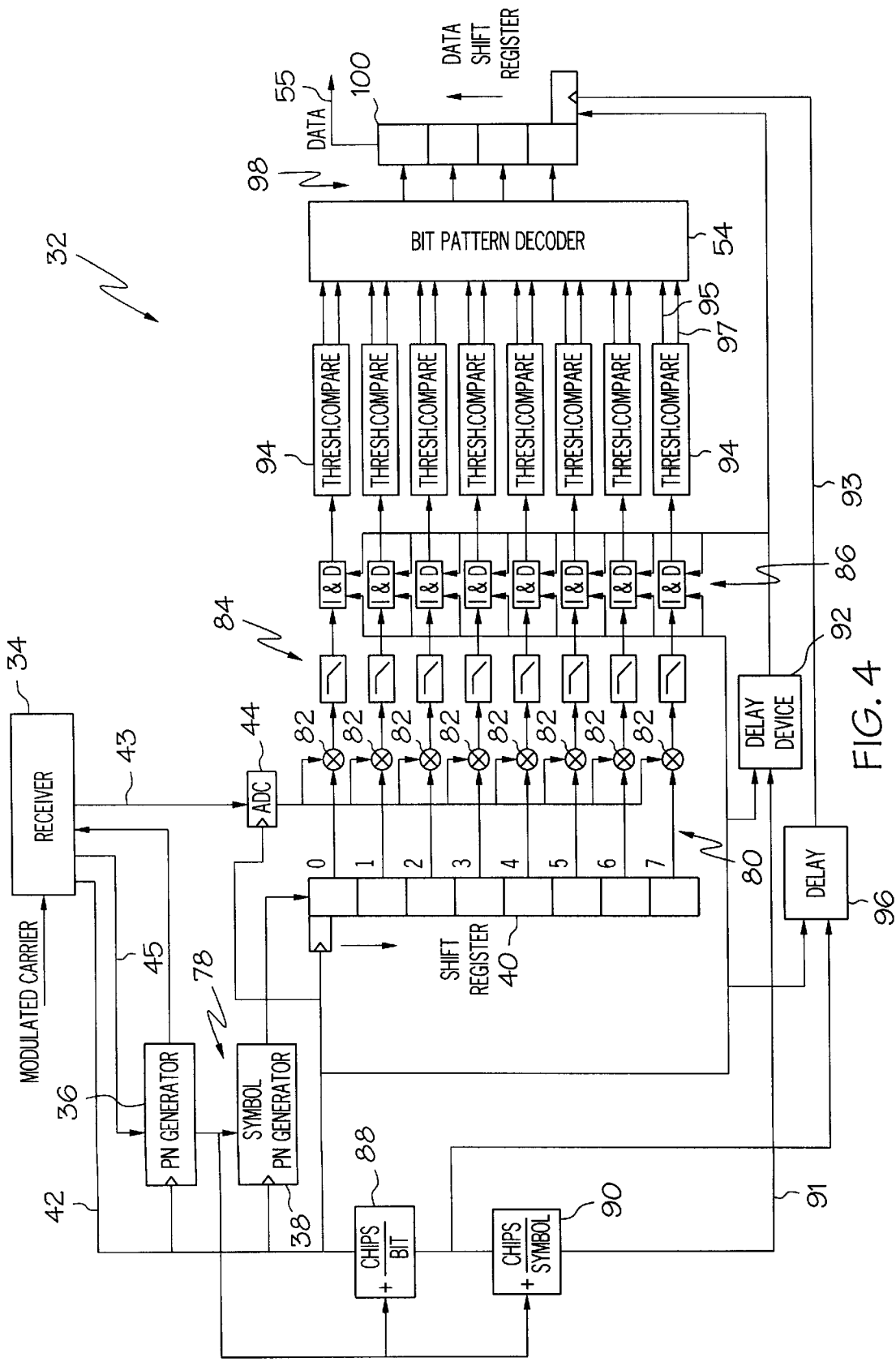
FIG. 4 is a schematic diagram of an exemplary embodiment of the receiving structure of the present invention, depicting the receiving structure in greater detail.

FIG. 4 depicts in further detail an exemplary embodiment of receiving structure 32 in accordance with the present invention. As shown in FIG. 4, the receiving structure 32 includes a receiver, which in the exemplary embodiment is a QPSK spread spectrum receiver 34. The receiver 34 may be any type of QPSK spread spectrum receiver known in the art which provides for carrier locking, alignment of a local pilot sequence epoch with the received pilot sequence epoch, and recovery of an analog baseband signal 43 from the Q channel. In addition to providing carrier locking, alignment, and recovery of the baseband signal 43, the receiver 34 also preferably provides a PN clock signal, identified as 42 in FIG. 4, which is aligned with the PN clock in the transmitting structure in a conventional manner when the receiver locks onto the carrier. The receiver 34 also preferably includes an epoch timing control 45, as shown in FIG. 4, for adjusting the phase of the local pilot PN sequence generated by a local PN generator 36, in order to match or lock the local pilot sequence to the received pilot sequence.

As mentioned above, the receiving structure 32 includes a local pilot PN generator 36 for generating a local pilot sequence. In addition, the receiving structure includes a local symbol PN generator 38 which generates a local symbol sequence. Both the local pilot and symbol PN generators 36, 38 are controlled by the PN clock signal 42 from the receiver 34. Preferably, the local pilot and symbol PN generators 36, 38 are controlled by a single PN clock, in the same manner as the PN generators 14, 16 in the transmitting structure 12, in order to synchronize the operation of the generators. In addition, an epoch sync pulse 78, similar to that used in the transmitting structure 12, may be transmitted between the local pilot and symbol PN generators 36, 38 to assure synchronization in the event of a fault or other problem in the PN generators or receiver. The epoch sync pulse 78 may also be transmitted to data and symbol clock dividers 88, 90 to reset the data and symbol clock signals.

As shown in FIG. 4, the PN sequence from the local symbol PN generator 38 is transmitted to a second tapped delay line, which in the exemplary embodiment is a shift register 40. The shift register 40 generates a plurality of delayed versions of the local symbol sequence, in a manner similar to the shift register 20 in the transmitting structure 12, by shifting successive chips of the local symbol PN sequence through the shift register stages. In the exemplary embodiment shown, the shift register has 8 stages in order to generate an equal number of delayed versions of the symbol sequence as the shift register 20 shown in FIG. 3. Output taps, designated as 80, are associated with each shift register stage in the same manner as in the transmitting structure 12, for outputting the delayed versions of the local symbol sequence as the local symbol sequence is shifted through the register. The local PN symbol sequence should correspond to the symbol sequence in the transmitting structure 12, so that the sequence at each of the output taps 80 in the receiving structure is the same as the sequence at the corresponding tap in the transmitting structure.

The analog baseband symbol sequence plus noise signal 43 recovered by the QPSK spread spectrum receiver 34 is quantized or sampled by A/D converter 44 at the PN clock rate as shown in FIG. 4. From the converter 44, the baseband signal samples are transmitted to a plurality of mixers 82. Each mixer 82 is also connected to an output tap 80 for one of the stages of shift register 40. The mixers 82 multiply the baseband signal samples with consecutive chips from each of the output taps as the local PN symbol sequence cycles through the shift register 40. If the chip at the output tap is a "1", the baseband symbol+noise sample is multiplied by 1. If the chip at the output tap is a "0", the baseband symbol+noise sample is multiplied by −1. The product of each tap multiplication is applied to a low pass filter, which are collectively designated as 84. Preferably, the bandwidth of each of the low pass filters 84 is set to optimize the $E_b/N_o$ value, and will typically be approximately equivalent to the symbol rate.

From being filtered, each of the products is applied to an integrate and dump (I&D) product detector, collectively designated as 86, which sums the products from a particular output tap during each symbol period. The symbol period is calculated from the PN clock by clock dividers 88 and 90 in the same manner as in the transmitting structure 12, so that the symbol period in the receiving structure is equivalent to the symbol period in the transmitting structure. Depending upon the type of filter utilized in the low pass filters 84, the symbol clock signal 91 derived by clock divider 90 may need to be delayed by delay device 92 in order to account for physical delay of the symbol sequence product signals through the filter. The amount of delay will depend on the specific filter 84 being used, and will typically be on the order of several chips. In addition, the data clock signal 93 may also need to be delayed by the same amount of chips to accommodate the low pass filters 84 as shown by delay structure 96.

At the end of each symbol period, each sum from the I&D devices 86 is transmitted or dumped to a threshold compare device, collectively designated as 94, which compares the absolute value of the sum with a predetermined threshold. The predetermined threshold may be any quantity depending on the application, and is preferably based upon the number of chips in a symbol period and the signal-to-noise ratio for the system. In general, the predetermined threshold should correspond to the sum which would be obtained if each of the baseband signal samples matches each of the successive chips at one of the tap positions 80. A hit flag is generated by the threshold compare devices 94 when a sum exceeds the predetermined threshold. Preferably, only a single threshold compare device 94 generates a hit flag during each symbol period in order to identify the delayed symbol sequence for that period. The hit flag is transmitted, as shown at 95, to a bit pattern decoder 54 which identifies the source of the hit flag, and converts the flag into a bit pattern. If polarity is being utilized, then the decoder 54 also determines whether the polarity of the sum which produced the hit flag is positive or negative, and converts this information into a polarity bit. The polarity of the sum is transmitted from the compare device 94 as shown at 97.

As shown in FIG. 4, a plurality of output taps 98 are associated with the bit pattern decoder 54, for transferring the converted bit pattern to an output data shift register 100. The bit pattern is parallel loaded into the output shift register 100 at the delayed symbol clock transition point. Once loaded into the output shift register 100, individual bits are shifted out in a serial data stream 55 at the transition point of the delayed data clock signal. The serial data stream 55 represents the original serial data stream from the data source 26 in the transmitting structure.

Accordingly, as described above, in the present invention a number of delayed versions of a symbol sequence are generated by a tapped delay line, and the delayed versions are selectively transmitted in order to represent bit patterns or logic symbols. In the receiver, the selected delay in the symbol sequence is identified and converted back into the original bit pattern. By using the delay between a symbol PN sequence and a second, pilot sequence to represent bit patterns containing two or more message bits, the modulation system of the present invention enables more bits to be transmitted per symbol and, thus, enables data to be transmitted at a faster rate than previous direct sequence spread spectrum systems.

In addition, in the system of the present invention, the $E_b/N_o$ ratio at the input of the product detectors required to establish a specified Symbol Error Rate (SER) closely approximates the $E_b/N_o$ vs. Bit Error Rate (BER) characteristic of unipolar signaling. However, the system of the present invention can represent many symbols during the same time interval and at the same SER that unipolar signaling can represent one, accordingly, the bit rate can be increased many times without increasing the S/N ratio.

Figure 5:
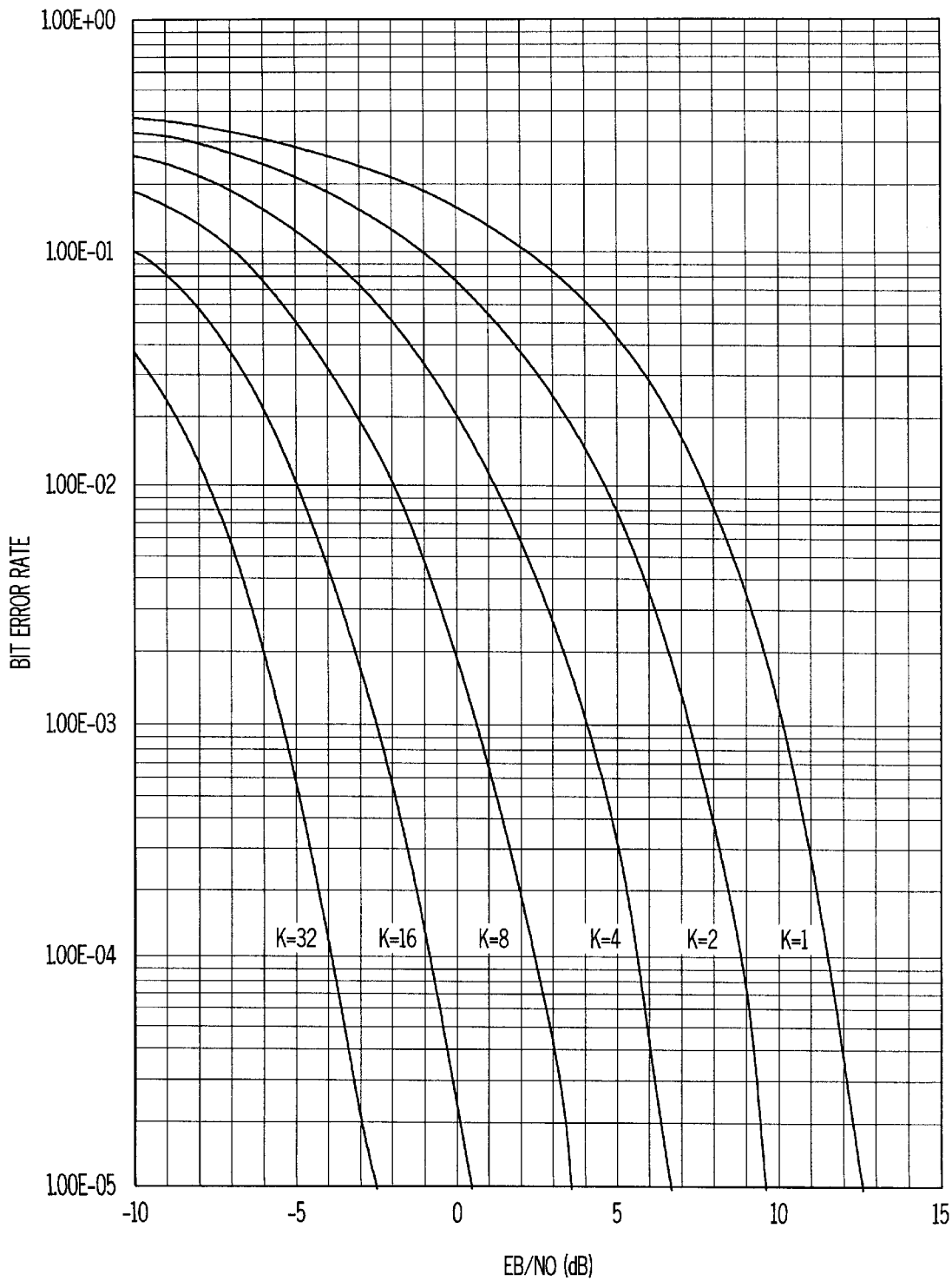
FIG. 5 is a graphical depiction of representative Bit Error Rate verses $E_b/N_o$ performance for the invention.

FIG. 5 is a graphical depiction of the relative Bit Error Rate vs. $E_b/N_o$ performance of an exemplary embodiment of the present invention. The graph in FIG. 5 depicts performance for K values ranging from 1 to 32 bits per symbol, with the K=4 curve depicting the performance for a four bit per symbol system as shown in the exemplary embodiment of FIGS. 3 and 4. The BER vs $E_b/N_o$ curves in FIG. 5 depict system performance for exemplary embodiments in which source coding is not utilized. Further reduction in the $E_b/N_o$ ratio for a given number of bits per symbol may be obtained by applying source coding.

Figure 6:
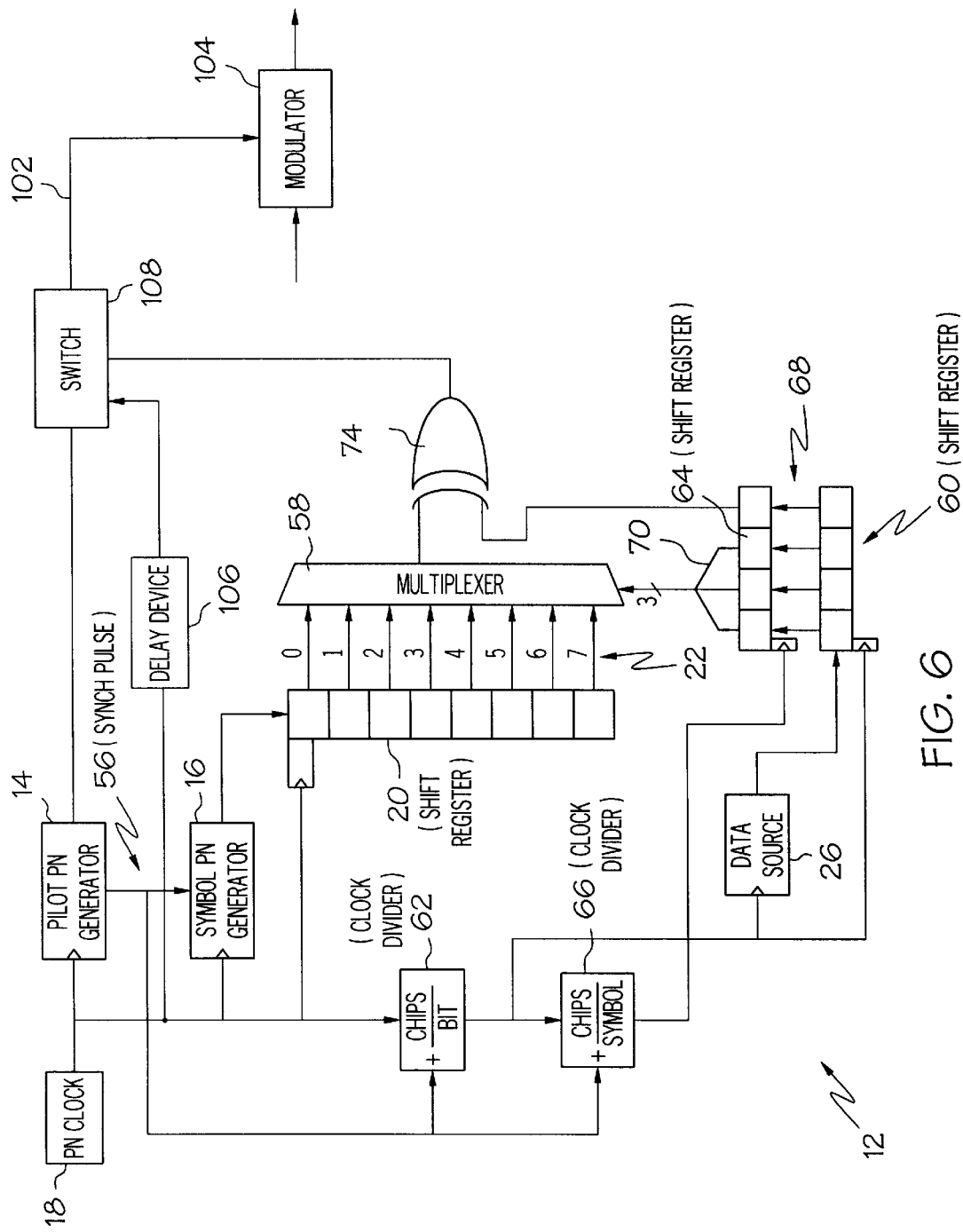
FIG. 6 is an alternative embodiment for the transmitting structure of the present invention.

FIG. 6 depicts an alternative embodiment for the transmitting structure 12 of the present invention. In the alternative embodiment, a BPSK modulator 104 and receiver are utilized for transmitting and receiving the modulated carrier signal. The BPSK modulator 104 utilizes only a single communication channel 102 for transmitting the PN sequences. Therefore, rather than transmitting the pilot sequence and selected delayed versions of the symbol sequence on separate channels, and aligning the local pilot sequence in the receiving structure with the transmitting structure pilot sequence epoch as the signals are received, as in the QPSK embodiment, the pilot sequence and selected delayed versions of the symbol sequence are transmitted consecutively to the receiver. In the BPSK embodiment, the pilot sequence is transmitted initially to the receiver, and used to align the receiver pilot sequence to the transmitting structure sequence.

After a predetermined time interval, during which alignment of the local pilot sequence epoch with the transmitting structure pilot sequence epoch is accomplished, the BPSK modulator 104 initiates transmittal of the selected delayed versions of the symbol sequence. The switch over from transmitting the pilot sequence to transmitting the selected symbol sequences may be controlled by a delay device 106, which sends a signal to a switch 108 associated with the modulator 104 a predetermined number of chips after system communications have been initiated. Upon receipt of the delay signal, the switch position would be altered so that the selected symbol sequences, rather than the pilot sequence would be transmitted to the modulator. The switch would continue in this state for the duration of the communications, enabling delayed versions of the symbol sequence to be continually transmitted to the receiver.

In addition to the embodiment in FIG. 6, additional alternative embodiments may be utilized without departing from the scope of the invention. These alternative embodiments include embodiments in which one or more of the digital components are replaced with analog equivalents such as, for example, sample and hold devices for the I&D product detectors, op amp filters for the digital low pass filters, and diode mixers for the digital mixers.

The foregoing description of the several preferred embodiments of the invention has been presented for purposes of illustration and description. It is not intended to be exhaustive or to limit the invention to the precise form or structures disclosed. Obvious modifications or variations are possible in light of the above teachings. The embodiments shown and described were chosen in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for modulating and demodulating a data signal containing one or more data bits, the method comprising the steps of:

generating a pilot PN sequence;

generating a symbol PN sequence having an epoch synchronized to an epoch of the pilot PN sequence;

producing a plurality of delayed versions of the symbol PN sequence, each delayed version of the symbol sequence having a distinct time offset relative to the pilot PN sequence epoch;

selecting from amongst the delayed versions of the symbol PN sequence based on one or more of the data bits in the data signal;

modulating a carrier signal with the pilot PN sequence and selected delayed versions of the symbol PN sequence;

transmitting the modulated carrier signal through a communication channel; and demodulating the modulated carrier signal to recover the data signal, by correlating the delayed symbol sequence from the carrier signal with one or more delayed versions of the symbol PN sequence.

2. The method as recited in claim 1, further comprising the step of generating a PN clock signal for synchronizing the generation of the pilot and symbol PN sequences.

3. The method as recited in claim 2, further comprising the steps of forming an address from one or more data bits in the data signal, associating an output tap with each delayed version of the symbol PN sequence, and using the address formed from the data bits to select from amongst the output taps.

4. The method as recited in claim 3, further comprising the steps of generating a data clock signal from the PN clock signal and using the data clock signal to control the formation of the address.

5. The method as recited in claim 2, further comprising the step of setting polarity for the selected delayed version of the symbol PN sequence.

6. The method as recited in claim 1, wherein each of the delayed versions of the symbol PN sequence is delayed one chip relative to a next preceding delayed version.

7. The method as recited in claim 1, wherein the pilot and symbol PN sequences are periodic and the pilot and symbol PN sequences contain an equal number of chips.

8. The method as recited in claim 1, further comprising the steps of generating a second pilot PN sequence, and aligning the epoch of the second pilot PN sequence with the epoch of the pilot PN sequence from the modulated carrier signal.

9. The method as recited in claim 8, further comprising the steps of generating a second symbol PN sequence, aligning the epoch of the second symbol PN sequence with the second pilot PN sequence epoch and producing a set of delayed versions of the second symbol PN sequence, each of the delayed versions of the second symbol PN sequence being delayed a distinct number of chips relative to the epoch of the second pilot sequence.

10. The method as recited in claim 9, further comprising the steps of recovering an analog baseband signal from the modulated carrier signal, and multiplying the analog baseband signal by each of the delayed versions of the second symbol PN sequence.

11. The method as recited in claim 10, further comprising the steps of filtering and summing the product of the analog baseband signal and each delayed version of the second symbol PN sequence over a symbol period and comparing each sum to a predetermined threshold.

12. The method as recited in claim 11, further comprising the step of determining whether each sum exceeds the predetermined threshold, and generating a bit pattern which corresponds to the sum which exceeds the predetermined threshold.

13. A method for transmitting a data signal in a spread spectrum communication system, the method comprising the steps of:

generating a first pilot PN sequence;

generating a first symbol PN sequence;

aligning the epochs of the first pilot and symbol PN sequences;

producing a plurality of delayed versions of the first symbol PN sequence;

selecting from amongst the delayed versions of the first symbol PN sequence according to the data signal;

modulating separate channels of a carrier signal with the first pilot PN sequence and selected delayed versions of the first symbol PN sequence;

generating a second pilot PN sequence;

generating a second symbol PN sequence;

producing a plurality of delayed versions of the second symbol PN sequence;

correlating the selected delayed versions of the first symbol PN sequence from the modulated carrier signal with the delayed versions of the second symbol PN sequence;

summing the correlated signals over a symbol period;

comparing the sums to a predetermined threshold; and converting the sum which exceeds the predetermined threshold into a bit stream.

14. The method as recited in claim 1, wherein the method provides for data transmission at an $E_b/N_o$ ratio of less than −1.6 dB.

15. The method as recited in claim 13 further comprising the step of setting the polarity of the selected delayed version of the first symbol PN sequence.

16. The method as recited in claim 13 wherein the first and second symbol PN sequences are equivalent.

17. A modulation/demodulation system for use in transmitting a message signal containing one or more data bits, the system comprising:

transmitting structure including,
a pilot PN generator for generating a periodic pilot PN sequence,
a symbol PN generator for generating a periodic symbol PN sequence having an epoch synchronized to the epoch of the pilot PN sequence,
a tapped delay line connected to the symbol PN generator for generating a plurality of delayed versions of the symbol PN sequence,
symbol selection structure associated with the tapped delay line for selecting from amongst the delayed versions of the symbol PN sequence based upon one or more of the data bits in the message signal, and
a modulator for modulating a carrier signal with the pilot PN sequence and selected delayed versions of the symbol PN sequence; and receiving structure for recovering the message signal by correlating the delayed symbol PN sequence from the modulated carrier signal with delayed versions of a local symbol PN sequence.

18. The system as recited in claim 17, further comprising a PN clock associated with the transmitting structure for synchronizing the pilot and symbol PN sequence generators.

19. The system as recited in claim 17, wherein each of the delayed versions of the symbol PN sequence corresponds to a distinct time delay from the pilot PN sequence epoch.

20. The system as recited in claim 17, wherein each delayed version of the symbol PN sequence corresponds to a delay of one additional chip from the pilot PN sequence epoch relative to a next preceding delayed version.

21. The system as recited in claim 17, wherein the tapped delay line includes a plurality of output taps, each tap corresponding to one delayed version of the symbol PN sequence.

22. The system as recited in claim 17 wherein the symbol selection structure device comprises a multiplexer.

23. The system as recited in claim 22, wherein the symbol selection structure further comprises a data shift register, the data shift register being connected to a source of the data signal for receiving one or more data bits of the message signal.

24. The system as recited in claim 23, wherein the data shift register is associated with the multiplexer for providing an address for the multiplexer.

25. The system as recited in claim 24, further comprising a data clock divider for receiving a clock signal from the PN clock, and generating a data clock signal for controlling the input of data bits into the data shift register.

26. The system as recited in claim 17, wherein the modulator is a quadrature phase shift keying modulator and the pilot PN sequence is applied to the I channel of the modulator and the selected delayed version of the symbol PN sequence is applied to the Q channel of the modulator for modulating the carrier signal.

27. The system as recited in claim 17, further comprising structure for setting polarity for the selected delayed version of the symbol PN sequence.

28. The system as recited in claim 17, wherein the receiving structure further comprises a local pilot PN sequence generator for generating a local pilot PN sequence, and a receiver having a timing control for aligning the epoch of the local pilot PN sequence with the epoch of the pilot PN sequence recovered from the modulated carrier signal.

29. The system as recited in claim 25, wherein the receiving structure further comprises a local symbol PN sequence generator for generating a local symbol PN sequence corresponding to the symbol PN sequence in the transmitting structure.

30. The system as recited in claim 29, wherein the receiving structure further comprises:
- a tapped delay line for providing one or more delayed versions of the local symbol PN sequence;
- one or more mixers for multiplying each of the delayed versions of the local symbol PN sequence with a baseband signal recovered by the receiver;
- one or more summation devices for summing the products of the delayed versions and the baseband signal;
- one or more threshold compare devices for comparing each of the sums with a predetermined threshold; and,
- a bit pattern decoder for converting sums which exceed the predetermined threshold into bit patterns.

31. A system for modulating and demodulating a message signal containing a data bit stream, the system comprising:
- a first PN generator for generating a first PN sequence comprising a plurality of chips;
- a second PN generator for generating a second PN sequence comprising a plurality of chips equal to the number of chips in the first PN sequence, the second PN sequence having an epoch that is synchronized with an epoch of the first PN sequence;
- a tapped delay line associated with the second PN generator for generating a plurality of symbol sequences from the second PN sequence, one or more of the symbol sequences comprising an offset version of the second PN sequence, each successive symbol sequence being offset one additional chip from a preceding symbol sequence;
- symbol selection structure associated with the tapped delay line for selecting from amongst the plurality of symbol sequences as a function of the data bit stream to be transmitted;
- a modulator connected to the first PN generator and the tapped delay line for modulating the first PN sequence and the selected symbol sequences on separate channels of an RF carrier to form a modulated carrier signal; and
- receiving structure for recovering the selected symbol sequences from the modulated carrier signal and correlating the recovered selected symbol sequences with a plurality of delayed versions of a local symbol PN sequences to convert the selected symbol sequence to a bit pattern.

* * * * *